US010545673B2

(12) United States Patent
van Riel et al.

(10) Patent No.: US 10,545,673 B2
(45) Date of Patent: Jan. 28, 2020

(54) HYPERVISOR DEDUPLICATION PAGE COMPARISON SPEEDUP

(71) Applicant: Red Hat, Inc., Raleigh, NC (US)

(72) Inventors: Henri van Riel, Westford, MA (US); Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 112 days.

(21) Appl. No.: 15/835,142

(22) Filed: Dec. 7, 2017

(65) Prior Publication Data

US 2019/0179538 A1   Jun. 13, 2019

(51) Int. Cl.
*G06F 12/00* (2006.01)
*G06F 3/06* (2006.01)
(Continued)

(52) U.S. Cl.
CPC ............ *G06F 3/0608* (2013.01); *G06F 3/065* (2013.01); *G06F 3/067* (2013.01); *G06F 3/0641* (2013.01); *G06F 9/45558* (2013.01); *G06F 12/0891* (2013.01); *G06F 12/1009* (2013.01); *G06F 12/1036* (2013.01); *G06F 2009/45583* (2013.01); *G06F 2212/657* (2013.01)

(58) Field of Classification Search
CPC ....... G11C 8/18; G11C 7/1072; G11C 29/023; G11C 29/028; G11C 5/02; G11C 7/10; G11C 5/04; G11C 2207/2254; G06F 13/161; G06F 13/1647; G06F 13/4234; G06F 13/1657; H01L 2224/48091; H01L 2924/15311
USPC .......................................................... 711/6
See application file for complete search history.

(56) References Cited

U.S. PATENT DOCUMENTS

| 6,886,085 | B1* | 4/2005 | Shuf | ................... G06F 9/30047 711/143 |
| 8,909,845 | B1* | 12/2014 | Sobel | ................. G06F 9/45558 711/154 |

(Continued)

OTHER PUBLICATIONS

Jia, et al.; "Coordinate Memory Deduplication and Partition for Improving Performance in Cloud Computing"; https://www.researchgate.net publication/288022241_Coordinate_Memory_Deduplication_and_Partition_for_Improving_Performance_in_Cloud_Computing; IEEE Transactions on Cloud Computing. pp. 1-1. 10.1109/TCC.2015.2511738; Dec. 2015; pp. 1-13.

(Continued)

*Primary Examiner* — Mardochee Chery
(74) *Attorney, Agent, or Firm* — K&L Gates LLP

(57) ABSTRACT

A hypervisor deduplcation system includes a memory, a processor in communication with the memory, and a hypervisor executing on the processor. The hypervisor is configured to scan a first page, detect that the first page is an unchanged page, check a first free page hint, and insert the unchanged page into a tree. Responsive to inserting the unchanged page into the tree, the hypervisor compares the unchanged page to other pages in the tree and determine a status of the unchanged page as matching one of the other pages or mismatching the other pages in the tree. Responsive to determining the status of the page as matching another page, the hypervisor deduplicates the unchanged page. Additionally, the hypervisor is configured to scan a second page of the memory, check a second free page hint, deduplicate the second page if the free page hint indicates the page is unused.

20 Claims, 6 Drawing Sheets

(51) Int. Cl.
  *G06F 12/1036* (2016.01)
  *G06F 9/455* (2018.01)
  *G06F 12/1009* (2016.01)
  *G06F 12/0891* (2016.01)

(56) References Cited

U.S. PATENT DOCUMENTS

| | | |
|---|---|---|
| 9,135,038 B1 | 9/2015 | Uchronski et al. |
| 9,280,486 B2 | 3/2016 | van Riel |
| 9,552,233 B1 | 1/2017 | Tsirkin et al. |
| 9,672,062 B1 | 6/2017 | Tsirkin et al. |

OTHER PUBLICATIONS

Shashank Rachamalla; "All Page Sharing is Equal, but Some Sharing is More Equal than Others"; https://www.cse.iitb.ac.in/internal/techreports/reports/TR-CSE-2013-49.pdf; Department of Computer Science and Engineering; Indian Institute of Technology Bombay; 2013; (12 Pages).

Chen, et al.; "CMD: Classification-based Memory Deduplication through Page Access Characteristics"; http://asg.ict.ac.cn/baoyg/downloads/VEE-CMD.pdf; State Key Laboratory of Computer Architecture, Institute of Computing Technology, Chinese Academy of Sciences; University of Chinese Academy of Sciences; Mar. 12, 2014, Salt Lake City, Utah, USA; (12 Pages).

Veni, et al.; "Enhancing Memory Deduplication Using Temporal Page Sharing Behaviors in Virtual Environments" Department of Computer Science and Engineering National Institute of Technology; Advanced Computing, Networking and Informatics; 2014; Tiruchirappalli-620015, vol. 2; pp. 481-488; Tamil Nadu, India.

Corbet; "KSM tries again"; https://lwn.net/Articles/330589/; Aug. 28, 2009; (2 Pages).

* cited by examiner

HYPERVISOR DEDUPLICATION PAGE COMPARISON SPEEDUP

BACKGROUND

Memory deduplication improves memory utilization by detecting that two (or more) pages in memory are identical and merging the duplicate pair of pages into a single page. Guest operating systems and applications may create or edit memory pages during execution. Memory pages may reside in various application memory spaces. For example, a first memory page may reside in a first application's memory, while a second memory page may reside in a second application's memory. During execution, duplicate memory pages may exist. If the first and second memory pages have the same content, the first memory page may be considered a duplicate of the second memory page and removed. In such an example, the page table of the first application may be modified to point to the second memory page, and the first application may use the second memory page rather than the first memory page, thus improving the utilization of memory.

SUMMARY

The present disclosure provides new and innovative systems and methods for hypervisor deduplication page comparison speedup. In an example, a system includes a memory, a processor in communication with the memory, and a hypervisor executing on the processor. The hypervisor is configured to scan a first page of the memory, detect that the first page is an unchanged page, check a first free page hint, and insert the unchanged page into a tree responsive to the first free page hint indicating that the unchanged page is used by a guest OS. Responsive to inserting the unchanged page into the tree, the hypervisor is configured to compare the unchanged page to other pages in the tree. Additionally, the hypervisor is configured to determine a status of the unchanged page as either matching one of the other pages or mismatching the other pages in the tree. Responsive to determining the status of the unchanged page as matching one of the other pages, the hypervisor is configured to deduplicate the unchanged page. Additionally, the hypervisor is configured to scan a second page of the memory, check a second free page hint, and responsive to the second free page hint indicating that the second page is unused by the guest OS, deduplicate the second page.

In an example, a method includes scanning, by a hypervisor, a first page in a memory. Additionally, the hypervisor detects that the first page is an unchanged page, checks a first free page hint, and inserts the unchanged page into a tree responsive to the first free page hint indicating that the unchanged page is used by a guest OS. Responsive to inserting the unchanged page into the tree, the hypervisor compares the unchanged page to other pages in the tree. Additionally, the hypervisor determines a status of the unchanged page as either matching one of the other pages or mismatching the other pages in the tree. Responsive to determining the status of the unchanged page as matching one of the other pages, the hypervisor deduplicates the unchanged page. Additionally, the hypervisor scans a second page of the memory and checks a second free page hint. Responsive to the second free page hint indicating that the second page is unused by the guest OS, the hypervisor deduplicates the second page.

In an example, a non-transitory machine readable medium stores code, which when executed by a processor, is configured to scan a first page in a memory, detect that the first page is an unchanged page, and check a first free page hint. Responsive to the first free page hint indicating that the unchanged page is used by a guest OS, the non-transitory machine readable medium is configured to insert the unchanged page into a tree. Responsive to inserting the unchanged page into the tree, the non-transitory machine readable medium is configured to compare the unchanged page to other pages in the tree. Additionally, the non-transitory machine readable medium is configured to determine a status of the unchanged page as either matching one of the other pages or mismatching the other pages in the tree. Responsive to determining the status of the unchanged page as matching one of the other pages in the tree, the non-transitory machine readable medium is configured to deduplicate the unchanged page. Additionally, the non-transitory machine readable medium is configured to scan a second page in the memory and check a second free page hint. Responsive to the second free page hint indicating that the second page is unused by the guest OS, the non-transitory machine readable medium is configured to deduplicate the second page.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
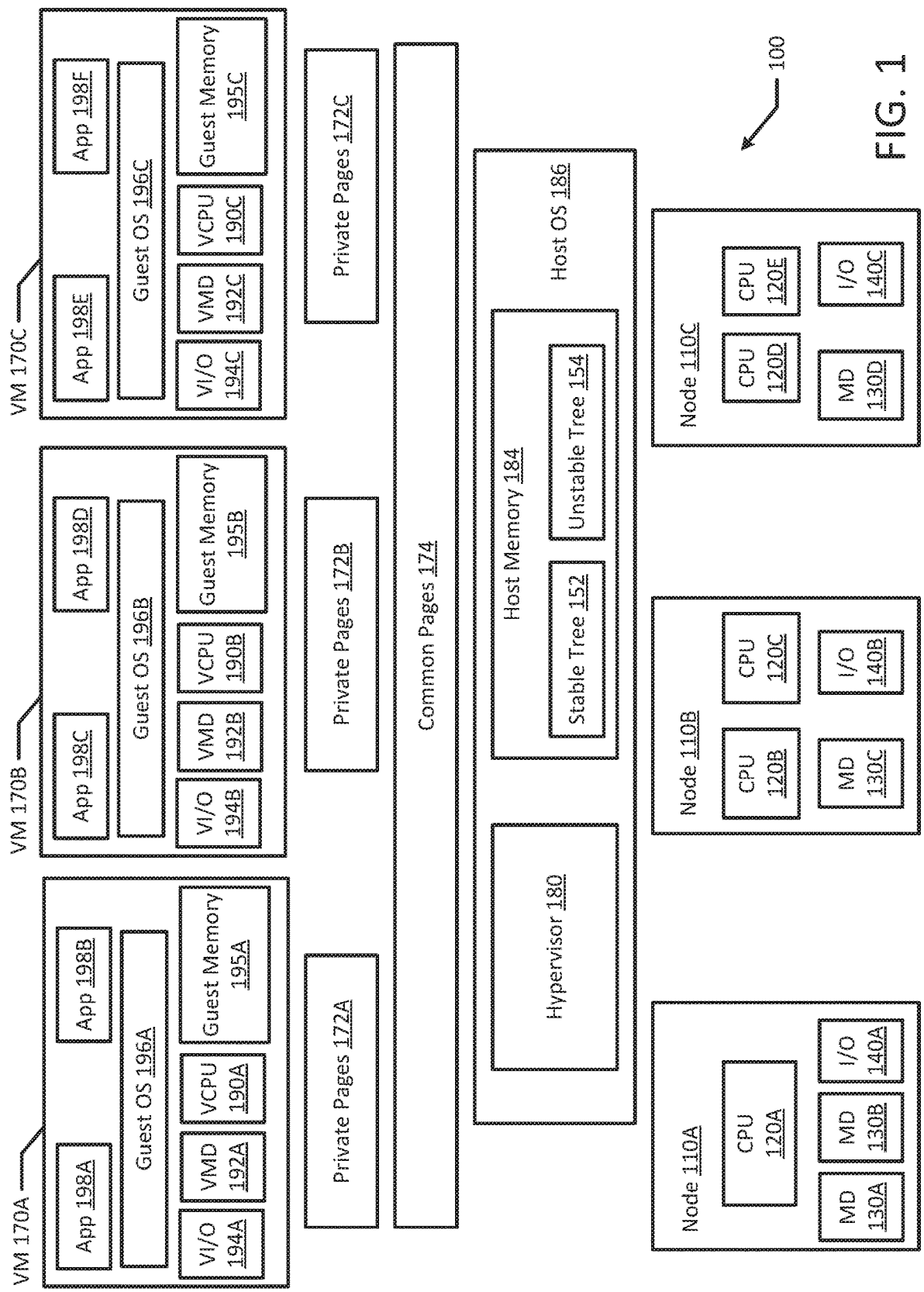
FIG. 1 illustrates a block diagram of an example computing system according to an example embodiment of the present disclosure.

Techniques are disclosed for hypervisor deduplication with a page comparison speedup. Memory deduplication improves memory utilization by detecting that two (or more) pages in memory that have identical content. For example, the identical memory pages may be merged into a single memory, which may be mapped into multiple addresses of applications or virtual machines to improve memory utilization.

Typically, techniques of memory deduplication are implemented by a hypervisor, which detects that a page is unchanged and adds the page to a stable memory tree, which is sorted by page contents. If the page lands in the same node of the tree as another page, the pages are identical and can be combined. Page table entries mapping the combined pages are mapped to the combined page in both respective virtual machines, and the other page (e.g., the deduplicated page) is reused by the hypervisor. However, inserting a page into the tree requires a quantity of comparisons proportional to the logarithm of the size of the input (e.g., the number of nodes in the tree). For example, the running time for searches grows at most proportional to the (log n), and thus inserting a page in a tree is an expensive operation which consumes CPU cycles and puts pressure on CPU cache.

As described in the various example embodiments disclosed herein, to reduce CPU overhead and processing time and to speed up memory deduplication for virtual machines, the hypervisor checks a free page hint after scanning virtual machine memory and detecting an unchanged page. For example, a guest OS may implement free page hinting and provide a hypervisor with hints about the status of a memory pages in guest memory. In some examples, the guest OS may provide the hypervisor with a hint as to whether memory pages in guest memory are being used by the guest (e.g., active in guest memory) or not being used by the guest (e.g., inactive in guest memory). In an example, the free page hints may be provided in a bitmap or bit array where each memory page corresponds to a bit of information in the bitmap. If the hint indicates that the page is used by the guest, the hypervisor will insert the page into an unstable memory tree. However, if the hint indicates that the page is free or unused by the guest OS, the hypervisor does not need to insert the page into the tree or compare its contents to other pages to deduplicate the page. The hypervisor can automatically deduplicate the page. For example, the hypervisor may make the page invalid in host page tables and reuse the page. The improved deduplication technique improves virtual machine density per host CPU as duplicate memory pages are quickly deduplicated to conserve system resources.

As used herein, deduplication may include merging memory pages, deleting memory pages, discarding memory pages, etc. For example, an unused or free page may be deduplicated or discarded. A used page that includes an identical page may be deduplicated or merged with another page and the duplicate may be removed (e.g., made invalid in host page table entries).

FIG. 1 depicts a high-level component diagram of an example computing system 100 in accordance with one or more aspects of the present disclosure. The computing system 100 may include an operating system (e.g., host OS 186), one or more virtual machines (VM 170A-C), and nodes (e.g., nodes 110A-C).

Virtual machines 170A-C may include a guest OS, guest memory, a virtual CPU (VCPU), virtual memory devices (VMD), and virtual input/output devices (VI/O). For example, virtual machine 170A may include guest OS 196A, guest memory or virtual machine memory 195A, a virtual CPU 190A, a virtual memory devices 192A, and a virtual input/output device 194A. Virtual machine memory 195A may include one or more memory pages. The memory pages may be private pages (e.g., private pages 172A) or common pages 174 (e.g., memory pages that are shared between virtual machines). Similarly, virtual machine 170B may include guest OS 196B, virtual machine memory 195B, a virtual CPU 190B, a virtual memory devices 192B, and virtual input/output device 194B. Virtual machine memory 195B may include one or more memory pages, such as private pages 172B and/or common pages 174. Virtual machine 170C may include guest OS 196C, virtual machine memory 195C, a virtual CPU 190C, a virtual memory devices 192C, and virtual input/output device 194C. Virtual machine memory 195C may include one or more memory pages, such as private pages 172C and/or common pages 174.

The computing system 100 may also include a hypervisor 180 and host memory 184. Hypervisor 180 may manage host memory 184 for the host operating system 186 as well as memory allocated to the virtual machines 170A-C and guest operating systems 196A-C such as guest memory or virtual machine memory 195A-C provided to guest OS 196A-C. Host memory 184 and virtual machine memory 195A-C may be divided into a plurality of memory pages that are managed by the hypervisor 180. Virtual machine memory 195A-C allocated to the guest OS 196A-C may be mapped from host memory 184 such that when a guest application 198A-F uses or accesses a memory page of virtual machine memory 195A-C, the guest application 198A-F is actually using or accessing host memory 184.

Hypervisor 180 may be configured to scan a page of the virtual machine memory or guest memory (e.g., guest memory 195A-C) to detect whether the page is an unchanged page from a previous scan. The hypervisor may also check a free page hint associated with the memory page. If the page is unchanged and the free page hint indicates that page is used by a guest OS (e.g., guest OS 196A), the page may be inserted into a tree, for example an unstable tree 154. The hypervisor may also be configured to determine whether the memory page matches another page in the tree, for example the unstable tree 154 and/or stable tree 152. If the memory page matches another page in the tree, then the memory page is deduplicated (e.g., the contents of the memory page are merged with the duplicate page) and saved in the stable tree 152. For example, the page table of virtual machine 170A, guest OS 196A, and/or application 198A may be modified to point to the combined memory page, and the virtual machine 170A may use the combined memory page in the common pages 174 rather than the memory page in its private pages 172A.

If the memory page does not match another page in the tree, the page is saved in the unstable tree 154. Any two identical pages in unstable tree 154 are combined into a single page and saved in stable tree 152. Additionally, the hypervisor 180 is configured to deduplicate memory pages if the free page hint indicates that the page is unused or freed by a guest OS (e.g., guest OS 196A-C). For example, if a guest no longer needs the data associated with a memory page, the guest OS (e.g., guest OS 196A-C) may place the page on a free list to indicate that the private page (e.g., private page 172A) is no longer used by guest OS 196A. By deduplicating pages based on free page hints, the hypervisor 180 advantageously deduplicates the memory page without the computational cost of comparing the page against other pages in the memory tree, thereby reducing CPU overhead and increasing the speed of deduplication (e.g., based on logarithmic function of tree size, such as the number of nodes).

In an example, a virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-C, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-C may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-E may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
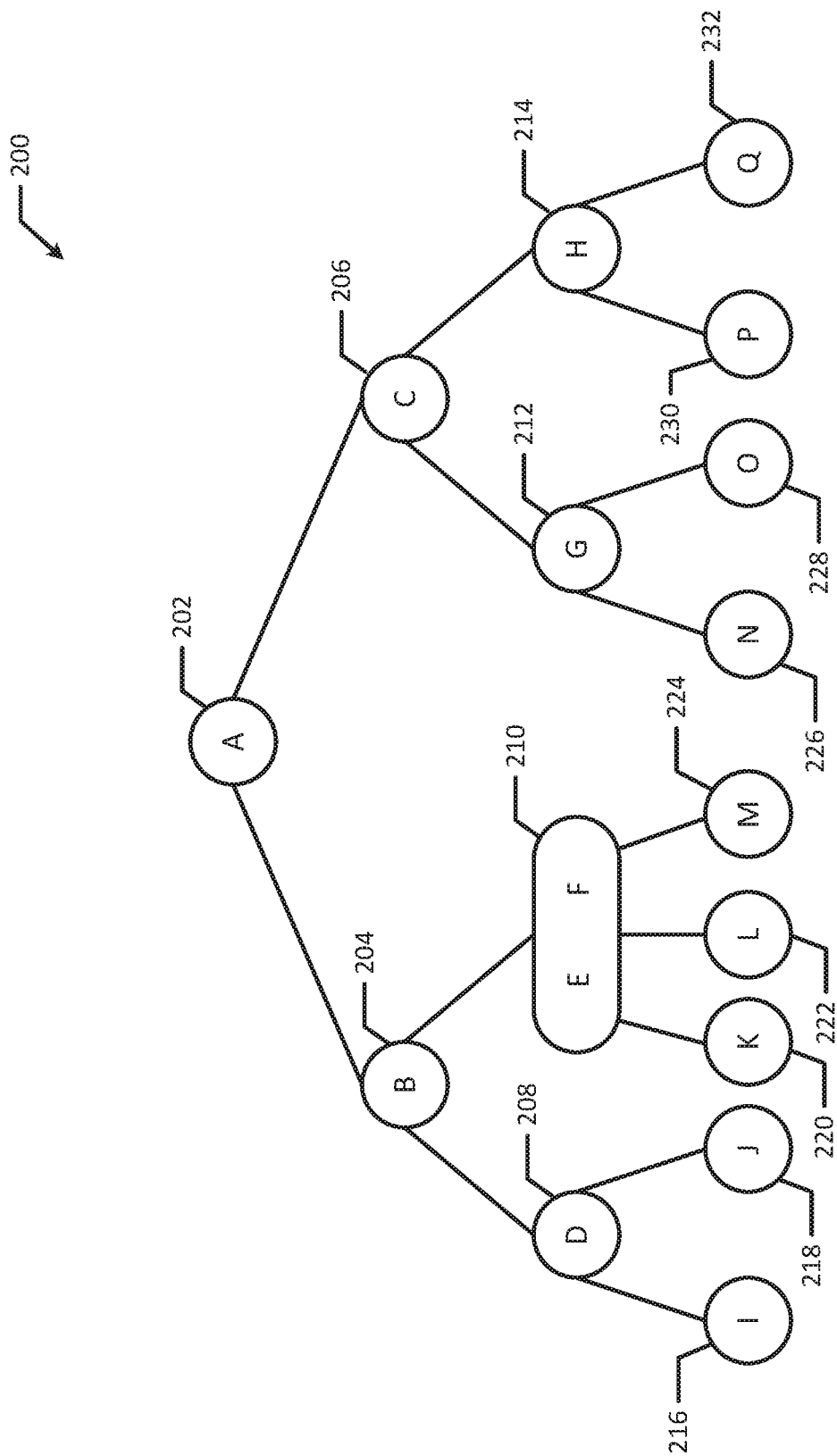
FIG. 2 illustrates a block diagram of a memory tree according to an example embodiment of the present disclosure.

FIG. 2 illustrates a block diagram of a memory tree 200. Stable tree 152 and/or unstable tree 154 may be constructed similarly to memory tree 200. The memory tree 200 may be a self-balancing binary search tree. The tree 200 may organize pieces of comparable data, such as memory pages into nodes (e.g., nodes 202 to 232). For example, each node of the tree may include a representation of a memory page. In another example, a node may include between one and three values. For example, node 210 includes two values. The memory tree 200 may keep the nodes (e.g., nodes 202 to 232) in sorted order so that lookup and other operations, such as comparisons, which allows the operation to skip approximately half of the tree 200. Depending on the structure of tree 200, the comparisons may skip more than half of the tree 200. For example, by following the tree 200 from root (e.g., node 202) to leaf (e.g., node 226), each comparison eliminates a branch of the tree 200.

In the illustrated example, each node (e.g., nodes 202 to 232) may include a representation of a memory page, such as a hash value for the respective memory page. When comparing a representation of a memory page to pages existing in the memory tree 200, the value corresponding to the memory page may be compared against the nodes (e.g., nodes 202 to 232) of the tree 200. If the value is less than node_A, then the hypervisor 180 may move along the left side of the memory tree 200 to determine if the value is greater than or less than node_B 204. If the value is greater than node_B 204, the hypervisor may continue to node_EF 210. For node_EF 210, the node may represent a range or interval of values. For example, if the value is between the value of E and F, then the hypervisor will continue to Node_L 222. If the value is less than the value of E, the hypervisor will continue to Node_K 220.

In an example, pages in memory tree 200 may be compared using a memory compare instruction, for example, memcmp( ). Pages that are unchanged after each scan are good candidates to place into a memory tree as the page contents have remained the same for some time and can be shared to other virtual machines. Conversely, pages that change each scan cycle are often volatile and may not be good candidates for sharing. In an example, an unstable tree 154 may be rebuilt after each scan cycle. Once duplicate pages have been located and merged, the contents of those pages are common pages 174, which may be marked as read-only and may be placed in the stable tree 152. A page may remain in stable tree 152 until it has been modified or unmapped by each virtual machine 170, guest OS 196, and/or application 198 using the page.

Figure 3:
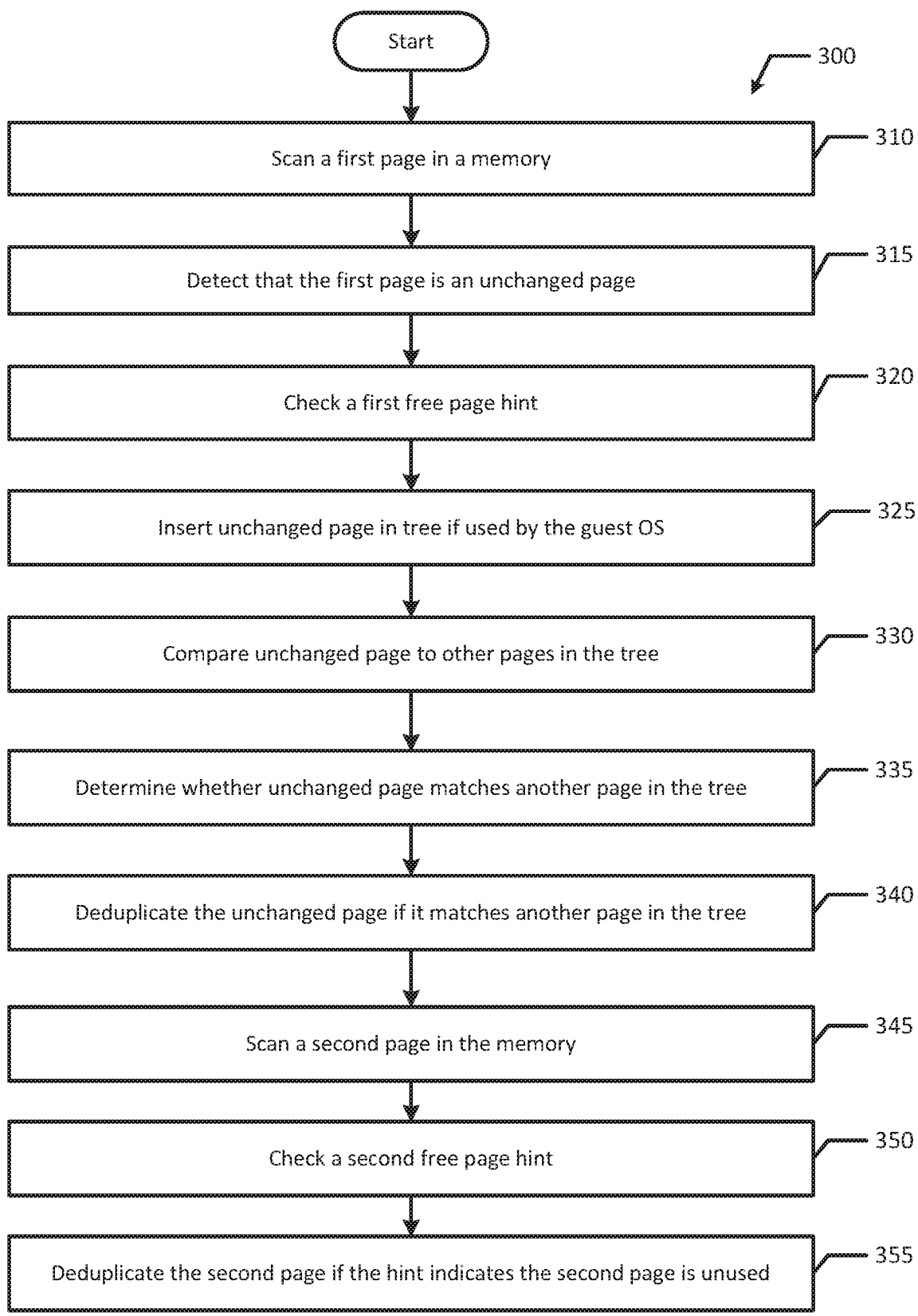
FIG. 3 illustrates a flowchart of an example process for hypervisor deduplication page comparison speedup according to an example embodiment of the present disclosure.

FIG. 3 illustrates a flowchart of an example method 300 for hypervisor deduplication page comparison according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes scanning a first page in a memory (block 310). For example, hypervisor 180 may scan memory pages, such as private pages 172A of virtual machine 170A. The hypervisor 180 may scan memory pages at a predetermined time interval or after a predetermined quantity of memory operations. For example, the hypervisor 180 may run a memory scan every 5 minutes. Then, method 300 includes detecting that the first page is an unchanged page (block 315). For example, hypervisor 180 may detect that a first page of virtual machine memory is unchanged from the previous scan. In an example, hypervisor 180 may keep track of page contents by moving a dirty bit from a page table to a page frame if memory is written to a page. For example, after a dirty bit is moved to a page frame, the page table entry corresponding to that location will get a dirty bit set. After a page is scanned, the hypervisor 180 may remove the dirty bit. If a page does not have a dirty bit set, then the page is unchanged from the last scan. In another example, the hypervisor 180 may detect unchanged pages by marking pages as read-only, such that pages that remain read-only from a previous scan are unchanged. For example, a page that remains read-only from a previous scan to the current scan has not had additional information written into the page, and remains unchanged between scan cycles.

A first free page hint is checked (block 320). For example, hypervisor 180 may check a page hint in a free page hint bitmap to determine if the page is used or unused by the guest OS 196. The free page hints may be provided in a memory page hint data structure, such as a bitmap that indicates page status corresponding to memory pages (e.g., page is used by guest OS 196 or page is unused by guest OS 196). The memory page data hint structure may be provided by the hypervisor 180 to the guest OS 196. Additionally, hypervisor 180 may provide a memory page hint data structure corresponding to each virtual machine 170, for example, there may be a free page hint bitmap for each respective virtual machine 170 (e.g., virtual machines 170A-C). In an example, the memory page hint data structure or free page hint bitmap is structured to be writable by the guest OS 196 and readable by the hypervisor 180.

In some examples, the memory page hint data structure or free page hint bitmap includes an entry corresponding to each memory page of the guest memory (e.g., guest memory 195A-C). For example, the memory page hint data structure may be structured as a bitmap that includes one or more bits corresponding to each memory page of the memory pages associated with guest memory (e.g., guest memory 195A-C). Other data structures such as one or more tables, linked lists, and so forth may also be used instead of or in addition to a bitmap. Each entry in the memory page hint data structure may be structured to include a data value that has a size of a bit, byte, or other length. The memory page hint data structure may be any data structure that may indicate a use status of a memory page. In an example, the bitmap may indicate that a page is used by the guest OS 196 with a value of "1" and may indicate that a page is unused or freed by the guest OS 196 with a value of "0".

In some examples, the memory page hint data structure (e.g., bitmap) is stored in the guest memory (e.g., guest memory 195A-C). In other examples, the memory page hint data structure may be stored in another address space that is not included in the guest memory. For example, the hypervisor 180 may store the memory page hint data structure in a memory that is allocated to the hypervisor 180 and is not included in the guest memory (e.g., guest memory 195A-C).

Then, the unchanged page is inserted in a tree if the unchanged page is used by the guest OS (block 325). For example, the hypervisor 180 may place the unchanged page in unstable tree 154. Then, the unchanged page is compared to other pages in the tree (block 330). For example, hypervisor 180 may compare the page to other pages in unstable tree 154, by comparing the page from a root node (e.g., node 202 of FIG. 2) to a predetermined leaf node (e.g., node 224 of FIG. 2). The method 300 includes determining whether the unchanged page matches another page in the tree (block 335). For example, hypervisor 180 determines that the unchanged page matches another page in the unstable tree 154 and/or stable tree 152 if the page matches an existing node of the tree. If the page matches an existing node, then a duplicate exists. If the page does not match an existing node, then the page is not a duplicate of an existing page.

The unchanged page is deduplicated if the unchanged page matches another page in the tree (block 340). For example, the hypervisor 180 may deduplicate the unchanged page by merging the unchanged page with the identical page found in the unstable tree 154 and/or stable tree 152. In an example, the hypervisor 180 may deduplicate the page by merging the pages into a single page and the page tables of associated with the matching pages may be modified to point to the merged memory page, while the duplicate page is deleted or reused.

The method 300 includes scanning a second page in the memory (block 345). For example, hypervisor 180 scans a second page in the virtual machine memory (e.g., guest memory 195A-C). In an example, the hypervisor may scan the second page as part of an entire scan cycle or as part of a subsequent scan. Then, a second free page hint is checked (block 350). For example, hypervisor 180 may check a free page hint associated with the second page in the free page hint bitmap. Additionally, the second page is deduplicated if the hint indicates that the second page is unused (block 355). For example, if the free page hint bitmap indicates that the second page is freed or unused by the guest OS 196, the hypervisor may deduplicate the page without comparing the page to other pages in unstable tree 154 and/or stable tree 152. When the page is freed by guest OS 196, the contents of the memory page (e.g., private page 172A) are no longer used by guest OS 196 and can be deduplicated with any page of the same virtual machine (e.g., virtual machine 170A). The hypervisor 180 may make the page invalid in host page tables and reuse the page.

Figure 4A:
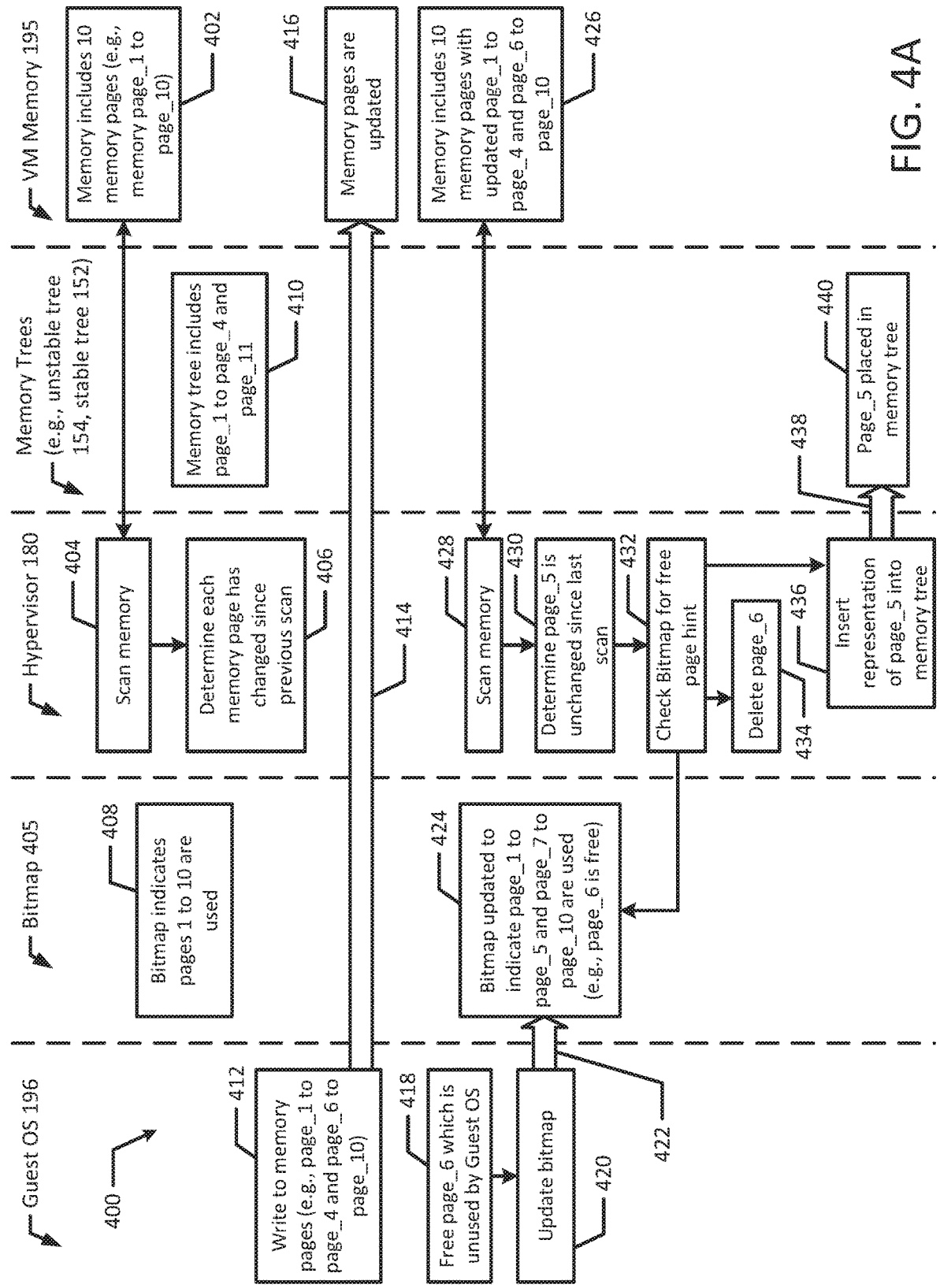
FIGS. 4A and 4B illustrate a flow diagram of an example process for hypervisor deduplication page comparison speedup according to an example embodiment of the present disclosure.
Figure 4B:
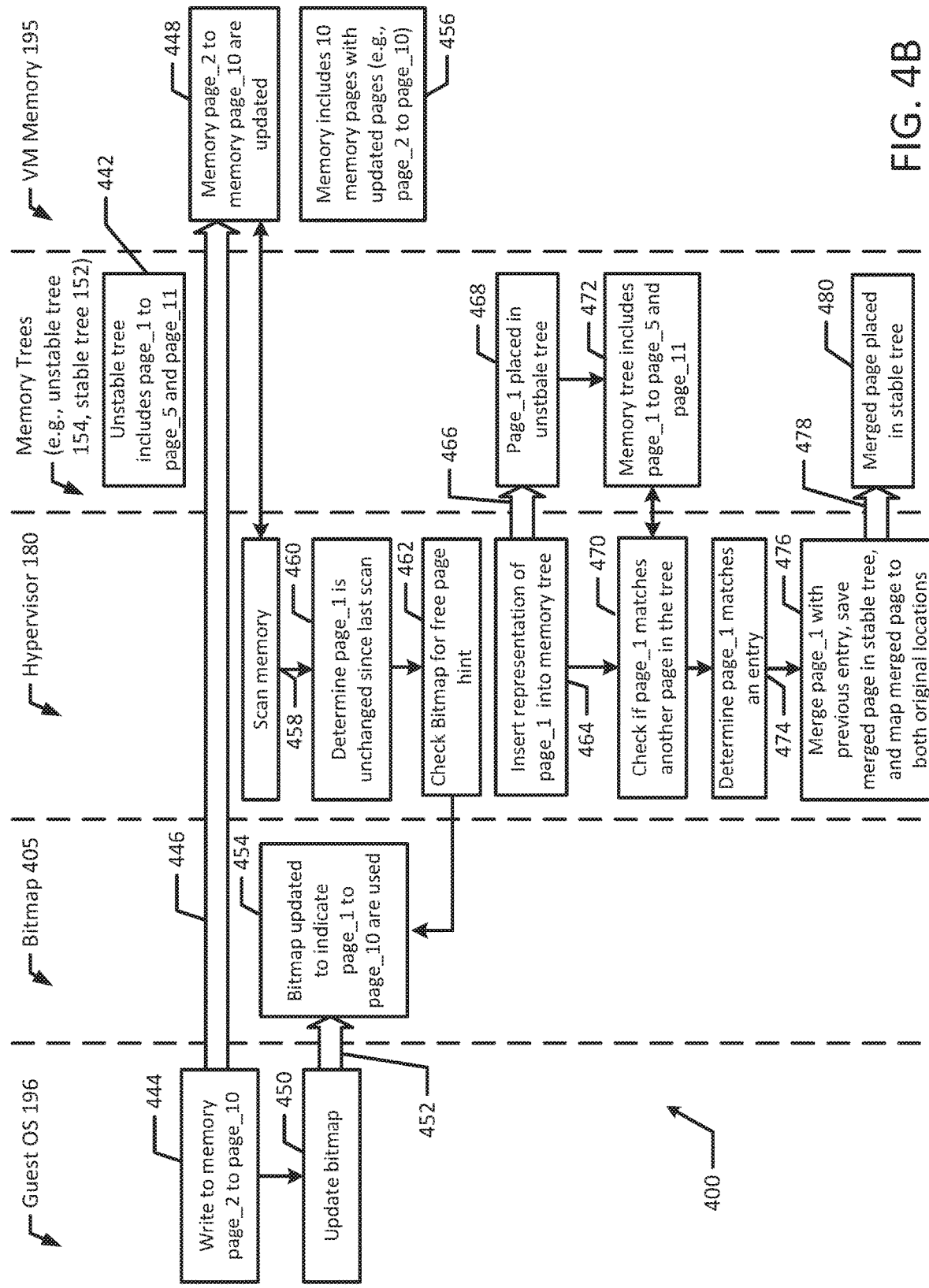

FIGS. 4A and 4B illustrate a flowchart of an example method 400 for hypervisor deduplication page comparison speedup in accordance with an example embodiment of the present disclosure. Although the example method 400 is described with reference to the flowchart illustrated in FIGS. 4A and 4B it will be appreciated that many other methods of performing the acts associated with the method 400 may be used. For example, the order of some of the blocks may be changed, certain blocks may be combined with other blocks, and some of the blocks described are optional. For example, a hypervisor 180 and guest OS 196 may communicate with a bitmap 405, unstable tree 154, and virtual machine memory 195 to perform example method 400.

In the illustrated example, virtual machine memory 195 includes ten memory pages (block 402). For example, the virtual machine memory may include page_1 to page_10, which may be a combination of private pages 172 and common pages 174. The hypervisor 180 scans the memory 195 (block 404). For example, hypervisor 180 may scan virtual machine memory 195 page by page. Then, in the illustrated example, the hypervisor 180 determines that each memory page (e.g., page_1 to page_10) has changed since a previous scan (block 406). For example, the hypervisor 180 may determine that each memory page was changed or written into by guest OS 196 since the previous scan. In an example, a hypervisor may determine that a memory page has changed by setting and unsetting dirty bits before and after scans.

In the illustrated example, a bitmap 405 indicates that memory page_1 to page_10 are used (block 408). For example, bitmap 405 may include one or more bits corresponding to each memory page (e.g., page_1 to page_10) of memory 195. In an example, other data structures such as one or more tables, linked lists, and so forth may also be used instead of or in addition to the bitmap 405. A bitmap value of "1" may indicate that the memory pages are used. For example, the bitmap 405 may have a value of "1" for each map location corresponding to memory page_1 to page_10. Additionally, the unstable tree 154 includes page_1, page_2, page_3, page_4, and page_11 (block 410). For example, during a previous scan, page_1 to page_4 and page_11 were unchanged and saved in the unstable tree 154. In an example, memory tree or unstable tree 154 may be a binary search tree.

The guest OS writes to various memory pages (blocks 412 and 414). For example, during operation, the guest OS uses and writes to memory page_1 to page_4 and page_6 to page_10. Then, the memory pages are updated (block 416). For example, memory page_1 to page_4 and page_6 to page_10 are updated with the information written to them by guest OS 196. In an example, a dirty bit may be moved from a page table to a page frame of each respective changed page.

In the illustrated example, guest OS 196 may free page_6 (block 418). For example, the guest OS 196 may be done using page_6 and may place the page on a free page list within guest OS 196. After page_6 is freed, the guest OS 196 updates the bitmap 405 (blocks 420 and 422). For example, the guest OS 196 may update the entry corresponding to page_6 in bitmap 405 to indicate that page_6 is free, for example, by changing the value from "1" to "0". The bitmap 405 is updated to indicate page_1 to page_5 and page_7 to page_10 are used (e.g., page_6 is free) (block 424). For example, the bitmap 405 includes a value of "0" for page_6 and a value of "1" for each other respective page. In an example, other values may be used to indicate whether a page is used or unused.

Due to the memory operations at blocks 412 and 414, the memory includes 10 memory pages with updated page_1 to page_4 and page_6 to page_10 (block 426). For example, the page table entries corresponding to page_1 to page_4 and page_6 to page_10 may have dirty bits set, which indicate that the pages were updated since the last scan. The hypervisor 180 scans the memory 195 (block 428). For example, the hypervisor 180 may perform another scan of virtual machine memory 195. In an example, the scan may take place after a predetermined amount of time (e.g., one minute, five minutes, ten minutes) from the previous scan. Then, the hypervisor 180 determines that page_5 is unchanged from the last scan (block 430). For example, hypervisor 180 may detect that page_5 is not associated with a dirty bit, which indicates that page_5 was not modified or written into by guest OS 196 since the last scan.

Additionally, the hypervisor 180 checks the bitmap 405 for a free page hint (block 432). The bitmap 405 indicates that page_6 is free with by showing a value of "0" for page_6. Because the page bitmap indicates that page_6 is free, the hypervisor deletes page_6 (block 434). For example, the hypervisor 180 deduplicates or discards page_6 by deleting the page or making the page invalid in host page tables. Because page_5 is unchanged since the last scan, the hypervisor 180 inserts a representation of page_5 into the unstable tree 154 (blocks 436 and 438). For example, the hypervisor 180 may insert page_5 into unstable tree 154 for comparison against existing pages in the unstable tree 154 and other memory pages scanned during the scan cycle.

Page_5 is placed into the unstable tree 154 (block 440). In an example, a representation of page_5, such as a hash of the memory page may be inserted into the unstable tree 154. As illustrated in FIG. 4B, the memory tree now includes page_1 to page_5 and page_11 (block 442). Since the unstable tree 154 did not include a duplicate of page_5, page_5 or a representation of the page is saved to the unstable tree 154.

The guest OS 196 may continue performing memory operations, for example, from applications 198 accessing and receiving data. The guest OS 196 writes to memory page_2 to memory page_10 (block 444 and 446). For example, the guest OS 196 writes to various memory pages while using applications 198. Then, memory page_2 to page_10 are updated (block 448). In an example, when memory pages are updated (e.g., page_2 to page_10), a dirty bit is set for the page, for example, in the page table entry associated with the location of the memory page.

After writing to the memory pages, the guest OS 196 updates the bitmap 405 (blocks 450 and 452). In an example, guest OS 196 may update bitmap 405 after each memory operation. In another example, guest OS 196 may updated bitmap 405 after updating the free page list inside guest OS 196. In the illustrated example, the bitmap 405 is updated to indicate that page_1 to page_10 are used (block 454). For example, the bitmap 405 may include bit values of "1" to indicate that page_1 to page_10 are used. By indicating that a page is used, the hypervisor 180 keeps the page as either a private page 172 or common page 174 depending on whether the page is a duplicate of another page in virtual machine memory 195.

Due to the memory operations at blocks 444 and 446, the memory includes 10 memory pages with updated pages, for example, page_2 to page_10 are updated (block 456). As discussed above, the 10 pages of virtual machine memory 195 has an unchanged page (e.g., page_1) and changed pages (e.g., page_2 to page_10) since scanning the memory at block 428.

The hypervisor scans the memory (block 458). For example, the hypervisor 180 may scan the memory 195 again after another 5 minute interval. After scanning the memory, the hypervisor 180 determines that page_1 is unchanged from the last scan (block 460). Then, the hypervisor 180 checks the bitmap 405 for a free page hint (block 462). For example, the hypervisor 180 may check bitmap 405, which indicates that page_1 is used by guest OS 196 and thus the page can not be automatically deduplicated. The hypervisor 180 inserts a representation of page_1 into the unstable tree 154 (blocks 464 and 466). For example, since the bitmap indicates that page_1 is used, and the page is unchanged from the previous scan, the hypervisor places page_1 into the unstable tree 154. Page_1 is placed in the unstable tree 154 (block 468). In an example, the page may be placed in memory tree or unstable tree 154 by calculating a hash associated with the page and storing the hash value in the unstable tree 154.

The hypervisor 180 checks if page_1 matches another page in the unstable tree 154 (block 470). The hypervisor 180 may compare page_1 to other pages in unstable tree 154 using a binary search or a compare function. The unstable tree 154 may keep nodes (e.g., nodes 202 to 232) in sorted order so that lookup and other operations, such as comparisons, allows the operation to skip approximately half of the tree with each comparison. For example, each comparison advantageously eliminates a branch of the tree.

The memory tree includes page_1 to page_5 and page_11 (block 472). In the illustrated example, the hypervisor determines that page_1 matches an entry in the memory tree (block 474). For example, contents of page_1 already existed in the memory tree and the updated page_1 matches those contents.

Then, the hypervisor merges page_1 with the previous entry, saves the merged page in stable tree 152, and maps the merged page to both original locations (block 476 and 478). For example, hypervisor 180 may merge the contents of the matching pages into a single page and may save the page into a stable tree 152. The page table entries associated with the matching pages may be changed to point to the new merged page saved in stable tree 152. The deduplicated pages may be marked as invalid and may be reused and allocated to the guest for other uses. The merged page is placed in stable tree 152 (block 480). For example, pages saved in stable tree 152 may be common pages 174 shared between guest OS's (e.g., guest OS 196A-C) and/or virtual machines (e.g., virtual machine 170A-C). The hypervisor 180 may advantageously deduplicate unused pages or free pages as well as duplicate pages to reduce memory consumption of duplicate private pages 172. By deduplicating or discarding pages automatically from the free page hints in bitmap 405, the hypervisor 180 automatically speeds up the deduplication process by eliminating the page comparison process.

Figure 5:
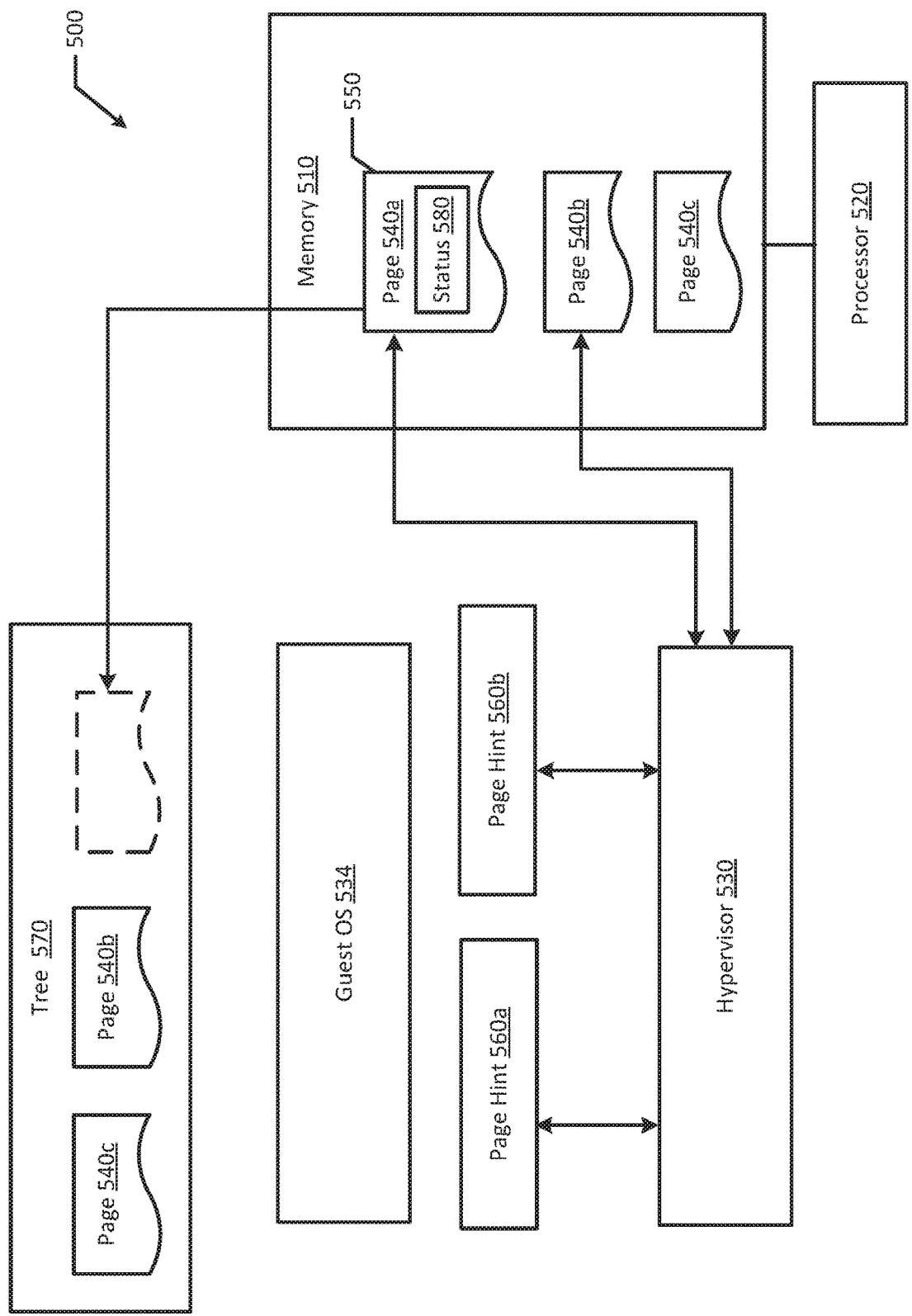
FIG. 5 illustrates a block diagram of an example hypervisor deduplication system according to an example embodiment of the present disclosure.

FIG. 5 is a block diagram of an example hypervisor deduplication system 500 according to an example embodiment of the present disclosure. The hypervisor deduplication system 500 includes a memory 510, a processor 520 in communication with the memory 510, and a hypervisor 530 executing on the processor 520. The hypervisor 530 is configured to scan a first page 540a of the memory 510, detect that the first page 540a is an unchanged page 550, check a first free page hint 560a, and insert the unchanged page 550 into a tree 570 responsive to the first free page hint 560a indicating that the unchanged page 550 is used by a guest OS 534. Responsive to inserting the unchanged page 550 into the tree 570, the hypervisor 530 is configured to compare the unchanged page 550 to other pages (e.g., pages 540b and 540c) in the tree 570. Additionally, the hypervisor 530 is configured to determine a status 580 of the unchanged page 550 as one of matching one of the other pages or mismatching the other pages in the tree. Responsive to determining the status 580 of the unchanged page 550 as matching one of the other pages (e.g., pages 540b and 540c), the hypervisor 530 is configured to deduplicate the unchanged page 550. Additionally, the hypervisor 530 is configured to scan a second page 540b of the memory 520, check a second free page hint 560b, and responsive to the second free page hint 560b indicating that the second page 540b is unused by the guest OS 534, deduplicate the second page 540b. By automatically deduplicating or discarding the free pages without comparing the pages to pages in the memory tree 570, the hypervisor 180 advantageously saves CPU cycles and system resources, thereby speeding up the deduplication processing allowing higher virtual machine density per host CPU.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
a processor in communication with the memory; and
a hypervisor executing on the processor, wherein the hypervisor is configured to:
scan a first page of the memory,
detect that the first page is an unchanged page,
check a first free page hint,
responsive to the first free page hint indicating that the unchanged page is used by a guest OS, insert the unchanged page into a tree,
responsive to inserting the unchanged page into the tree, compare the unchanged page to other pages in the tree,
determine a status of the unchanged page as one of matching one of the other pages or mismatching the other pages in the tree,
responsive to determining the status of the unchanged page as matching one of the other pages, deduplicate the unchanged page,
scan a second page of the memory,
check a second free page hint, and
responsive to the second free page hint indicating that the second page is unused by the guest OS, deduplicate the second page.

2. The system of claim 1, wherein the memory is virtual machine memory.

3. The system of claim 1, wherein the free page hint is included in a page bitmap.

4. The system of claim 3, wherein the page bitmap indicates whether a page is used by the guest OS or is unused by the guest OS.

5. The system of claim 1, wherein the tree is an unstable tree, such that contents of the tree are volatile.

6. The system of claim 1, wherein deduplicating the unchanged page includes invalidating the unchanged page in a page table.

7. The system of claim 1, wherein the hypervisor is further configured to detect that the second page is a second unchanged page.

8. The system of claim 1, wherein the tree is rebuilt after each respective scan.

9. A method comprising:
scanning, by a hypervisor, a first page in a memory;
detecting, by the hypervisor, that the first page is an unchanged page;
checking a first free page hint;

responsive to the first free page hint indicating that the unchanged page is used by a guest OS, inserting, by the hypervisor, the unchanged page into a tree;

responsive to inserting the unchanged page into the tree, comparing, by the hypervisor, the unchanged page to other pages in the tree;

determining, by the hypervisor, a status of the unchanged page as one of matching one of the other pages or mismatching the other pages in the tree;

responsive to determining the status of the unchanged page as matching one of the other pages, deduplicating, by the hypervisor, the unchanged page;

scanning, by the hypervisor, a second page of the memory;

checking, by the hypervisor, a second free page hint; and responsive to the second free page hint indicating that the second page is unused by the guest OS, deduplicating, by the hypervisor, the second page.

10. The method of claim 9, wherein the memory is virtual machine memory.

11. The method of claim 9, wherein the first free page hint is included in a page bitmap.

12. The method of claim 11, wherein the page bitmap indicates whether the first page is used by the guest OS or is unused by the guest OS.

13. The method of claim 9, wherein the tree is an unstable tree, such that contents of the tree are volatile.

14. The method of claim 9, wherein deduplicating the second page includes freeing the second page.

15. The method of claim 9, further comprising:
moving, by the hypervisor, a dirty bit from a page table to a page frame in response to information written to a page in memory, wherein detecting an unchanged page from a previous scan includes searching for dirty bits.

16. The method of claim 9, wherein detecting an unchanged page from a previous scan includes determining that the first page has remained as read-only from the previous scan.

17. The method of claim 9, further comprising:
detecting, by the hypervisor, that the second page is a second unchanged page.

18. The method of claim 9, wherein deduplicating the second page includes invalidating the second page in a host page table.

19. The method of claim 9, wherein deduplicating the unchanged page includes merging the unchanged page and a respective matching page to create a merged page, and placing the merged page in a stable tree.

20. A non-transitory machine readable medium storing code, which when executed by a processor, is configured to:
scan a first page in a memory;
detect that the first page is an unchanged page;
check a first free page hint;
responsive to the first free page hint indicating that the unchanged page is used by a guest OS, insert the unchanged page into a tree;
responsive to inserting the unchanged page into the tree, compare the unchanged page to other pages in the tree;
determine a status of the unchanged page as one of matching one of the other pages or mismatching the other pages in the tree;
responsive to determining the status of the unchanged page as matching one of the other pages in the tree, deduplicate the unchanged page;
scan a second page in the memory;
check a second free page hint; and
responsive to the second free page hint indicating that the second page is unused by the guest OS, deduplicate the second page.

* * * * *